(12) United States Patent  
Schreter

(10) Patent No.: US 7,386,702 B2  
(45) Date of Patent: Jun. 10, 2008

(54) SYSTEMS AND METHODS FOR ACCESSING THREAD PRIVATE DATA

(75) Inventor: Ivan Schreter, Leimen (DE)

(73) Assignee: SAP AG, Walldorf (DE)

( * ) Notice: Subject to any disclaimer, the term of this patent is extended or adjusted under 35 U.S.C. 154(b) by 506 days.

(21) Appl. No.: 10/910,402

(22) Filed: Aug. 4, 2004

(65) Prior Publication Data

US 2005/0097258 A1 May 5, 2005

(30) Foreign Application Priority Data

Aug. 5, 2003 (EP) .................................. 03017836

(51) Int. Cl.  
*G06F 12/00* (2006.01)

(52) U.S. Cl. ............................ 711/220; 711/1; 711/214

(58) Field of Classification Search ...................... None  
See application file for complete search history.

(56) References Cited

U.S. PATENT DOCUMENTS

| 5,511,192 | A | 4/1996 | Shirakihara | |
|---|---|---|---|---|
| 5,727,178 | A | 3/1998 | Pletcher et al. | |
| 6,654,781 | B1 * | 11/2003 | Browning | 718/104 |
| 6,915,408 | B2 * | 7/2005 | Huras | 711/220 |
| 2002/0059503 | A1 * | 5/2002 | Dennie | 711/153 |

OTHER PUBLICATIONS

International Preliminary Report on Patentability, dated Aug. 5, 2003 (7 pages).

* cited by examiner

*Primary Examiner*—Reginald Bragdon  
*Assistant Examiner*—Horace L. Flournoy  
(74) *Attorney, Agent, or Firm*—Finnegan, Henderson, Farabow, Garrett & Dunner LLP

(57) ABSTRACT

Systems and methods are provided for accessing thread private data in a computer. In one embodiment, a method is provided for accessing thread private data in a computer for a program executed by using a plurality of threads, wherein each of the plurality of threads may be associated with a different area of its respective stack for storage of thread private data. Further, the stacks of threads may cover a coherent address space in a memory of the computer, starting at a base address. The method may include determining a thread identifier of the one of the plurality of threads based on the base address and a stack pointer of one of the plurality of threads. In addition, the method may include accessing thread private data of one of the stacks based on the determined thread identifier.

27 Claims, 4 Drawing Sheets

SYSTEMS AND METHODS FOR ACCESSING THREAD PRIVATE DATA

BACKGROUND

1. Field of the Invention

The present invention generally relates to the field of data processing and, more particularly, to program execution by means of multiple threads.

2. Background of the Invention

In a multi-thread environment, the memory address space for global data is usually shared among the threads. In addition, the threads require storage of thread private data in dedicated data areas of respective stacks.

For example, the data used in a program written in the programming language C can be classified into two categories: global variables and auto variables. In these two categories, the global variables, which correspond to the global data to be shared among the threads in the above described model, are usually allocated in the data space as they are to be accessible from a plurality of functions. In contrast, the auto variables are usually allocated on the stacks, as they are declared within a function and valid only within that function.

In a multi-thread environment, it is often necessary to employ a data management method for supporting thread private data on a per thread basis. Conventionally, the following two methods have been proposed for this purpose.

(I) Method for Allocating Private Data on Stack Dynamically:

In this method, thread private data is allocated on the stack by declaring data used in several functions as auto variables in a certain function that is executed by each thread. Here, however, when the allocated data is to be used in other functions than the function that declared the auto variable, it is not possible for the other functions to directly access the allocated auto variables. Therefore, there arises a need for handing the address of the allocated variable as a function argument from the calling function to that called function.

Thus, in this conventional data management method for supporting private data for each thread, there is a need to pass the address of the private data as a function argument when calling one function from another function. Thus, the program entry for the called function that operates on the private data must contain the argument specifying the address of the private data and, consequently, the program becomes quite complicated. In addition, in the called function, there is a need to store the address of the private data on the stack.

(II) Method for Expanding Variables in Correspondence to Multiple Threads, and Accessing Variables by Using Thread Identifiers (IDs):

In this method, each part of the thread private data is globally declared as a global sequence having as many elements as there are threads. An access from each thread is made by using a thread ID which is uniquely assigned to each thread in advance. In this method, if the thread IDs are not supported at the OS level, it becomes necessary to support the thread IDs themselves by using the specialized method (I) described above. Moreover, even when the thread IDs are supported at the OS level, this method is not applicable to a case in which the number of threads changes dynamically. Thus, in this conventional data management method for supporting the global data privately by each thread, there is a need to provide the thread IDs.

U.S. Pat. No. 5,511,192 shows a specific method of managing thread private data in which the thread private data can be declared globally and which can deal with the change of the number of threads. The thread private data, to be globally accessible from the multiple threads and to be managed separately by each one of the multiple threads, is detected before the actual execution of the program, and a thread private data region for managing all the detected thread private data is allocated to the stack for each one of the multiple threads separately.

Then, a pointer to specify a base address of the thread private data region with respect to the stack for each one of the multiple threads is registered separately, such that while executing one of the multiple threads, accesses to the thread private data are made by making accesses to the thread private data region in the stack for that one of the multiple threads according to the base address specified by the pointer registered for that one of the multiple threads.

SUMMARY OF THE INVENTION

Embodiments consistent with the present invention provide systems and methods of accessing thread private data in, for example, a computer for a program to be executed by using multiple threads. Each one of the multiple threads may be associated with a different data area of its respective stack for storage of corresponding thread private data. The different stacks associated with these threads may cover a coherent address space in a memory of the computer that starts at a specific base address.

Each one of the threads may have a stack pointer that may be stored in a processor register while executing the thread on a processor. The thread identifier for a given thread may be determined on the basis of the base address and its stack pointer. By means of the thread identifier, access to the corresponding data area for the thread private data may be enabled.

In accordance with an embodiment of the invention, the stacks maybe of equal size. In this case, the thread ID for a given thread may be determined by calculating the integer value of the difference of the base address and the stack pointer of that thread divided by the stack size.

In accordance with another embodiment, the stacks may not be of equal size, but an integer multiple of a given block size. This may enable more efficient usage of the available memory in case the threads require stacks of various sizes.

When stacks having various sizes are used, the thread ID may be determined by first determining a block identifier (ID). The block ID may be obtained on the basis of the base address and the stack pointer of the thread. In particular, the block ID can be obtained by calculating the integer value of the difference of the base address and the stack pointer divided by block size. The resulting block ID may be mapped to the corresponding thread ID. For this purpose, a mapping table can be used.

In accordance with yet another embodiment of the invention, all thread IDs allocated in accordance with described method may have a non-negative sign. For example the thread IDs 0,1,2, . . . i, n−1 for a number of n threads are used, where i is an integer. In addition, there can be a main thread that may have an associated main stack of arbitrary size. Preferably, the main thread may have a thread ID having a sign that is opposed to the sign of the thread IDs of the multiple threads. For example, the thread ID of the main thread may be −1.

Among other advantages, embodiments of the invention may greatly simplify the determination of thread IDs and management of thread private data. This may considerably reduce the overhead required for thread determination. Thus, more efficient usage of a computer's resources may be achieved and program execution of a multi-threaded program can be accelerated.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this specification, illustrate various aspects and embodiments of the invention and together with the description, serve to explain the principles of the invention. In the drawings.

DETAILED DESCRIPTION

Figure 1:
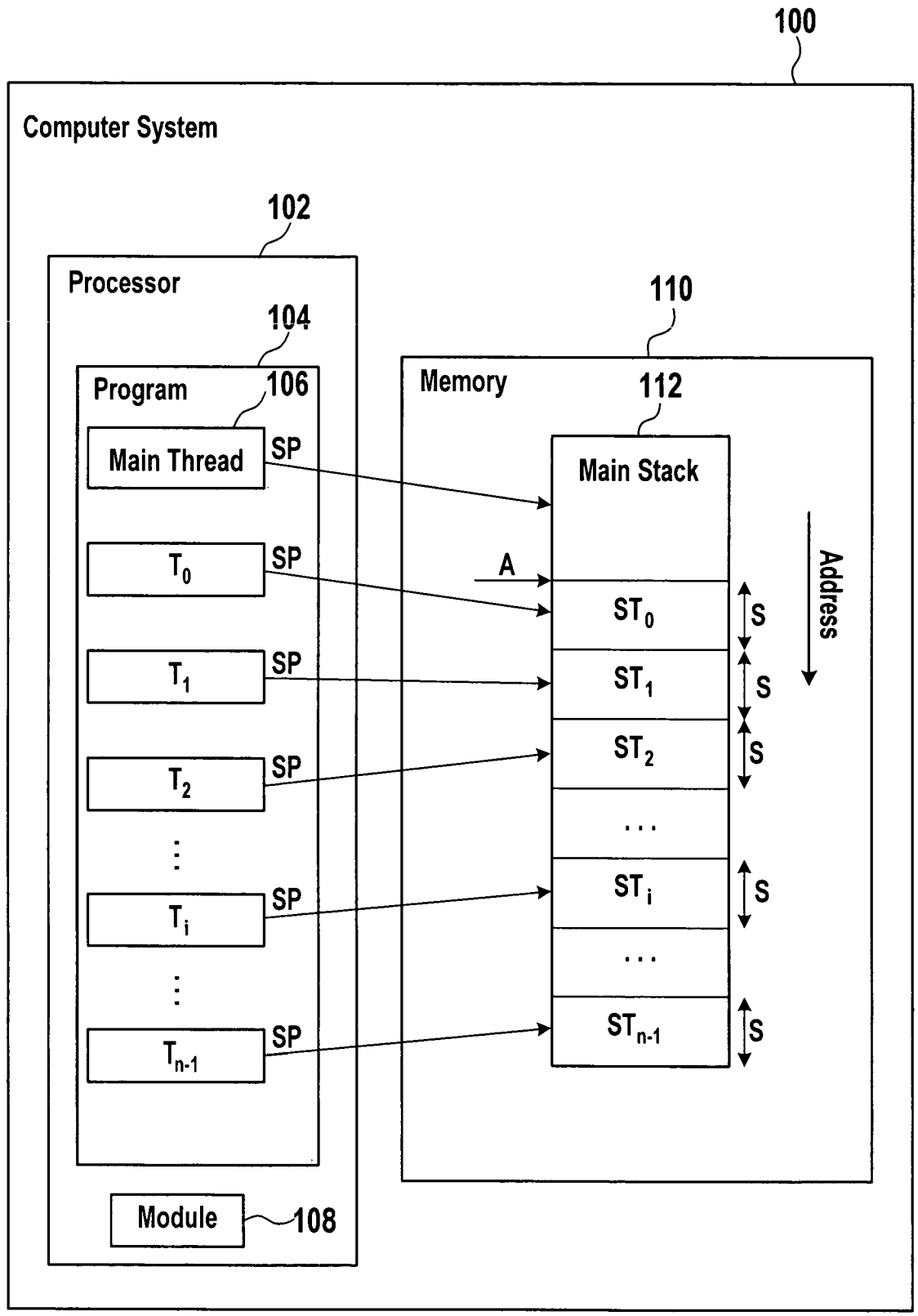
FIG. 1 is a block diagram of an exemplary computer system, consistent with an embodiment of the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

FIG. 1 is a block diagram of an exemplary computer system 100, consistent with an embodiment of the invention. As illustrated, computer system 100 may include a processor 102 for executing a program 104. Program 104 may have multiple threads T0, T1, T2, . . . Ti, . . . Tn−1, where n is the number of threads of program 104. In the example considered here, the thread ID of a thread Ti is i. Each one of the threads Ti may have a stack pointer SP. Further, program 104 may have a main thread 106. For example, the thread ID of main thread 106 is −1.

As illustrated in FIG. 1, a module 108 may serve to determine the thread ID of any one of the threads of program 104. Module 108 may be implemented as a program module or as a dedicated logic circuitry or a combination of both.

In one embodiment, computer system 100 may comprise a plurality of processors 102. In this case, the different threads of program 104 can be processed simultaneously by the multiple processors.

As further illustrated in FIG. 1, computer system 100 may include a memory 110. Memory 110 may be used for storing stacks ST0, ST1, ST2, . . . , STi, . . . STn−1 for the corresponding threads T0, T1, T2, . . . , Ti, . . . Tn−1. The index of the stack STi may be identical to the index of the thread Ti being assigned to that stack. In other words, thread T0 is assigned to stack ST0, thread T1 to stack ST1, thread T2 to stack ST2, . . . , thread Ti to stack STi, . . . , thread Tn−1 to stack STn−1. Each one of the stacks STi may have the same size S.

The stack pointer SP of main thread 106 may point to main stack 112, which may also be provided in memory 110.

The stacks ST0, ST1, ST2, . . . STn−1 may cover a coherent address space within memory 110 which starts at base address A.

In operation, one of the threads Ti may need to access its associated stack STi for reading and/or writing of thread private data. In order to obtain the thread ID for thread Ti, i.e., the value of i, module 108 may be invoked. Module 108 may calculate the difference between the stack pointer SP of thread Ti and base address A. This difference may be divided by stack size S. The integer value of the result of the division may be the value of i and, thus, the thread ID. The thread ID may be identical to the index i of the stack to which thread Ti is assigned. This way access of thread Ti to its associated stack STi may be enabled.

An exemplary calculation performed by module 108 in order to obtain a thread ID is given below:

$$\text{Thread }ID=\text{integer}[(SP-A)/S]$$

When main thread 106 needs to access main stack 112, the same calculation may be performed by module 108. As stack pointer SP of main thread 106 may point to a memory location, which is outside the coherent address space covered by the stacks STi, the result of the calculation performed by module 108 will be either below zero or above N−1. This way, it may be determined that a requesting thread is main thread 106 and not one of the multiple threads Ti. In the example considered here, the result of the calculation performed by module 108 would be negative, if main thread 106 is requesting thread, as the stack pointer SP of main thread 106 is below base address A.

Figure 2:
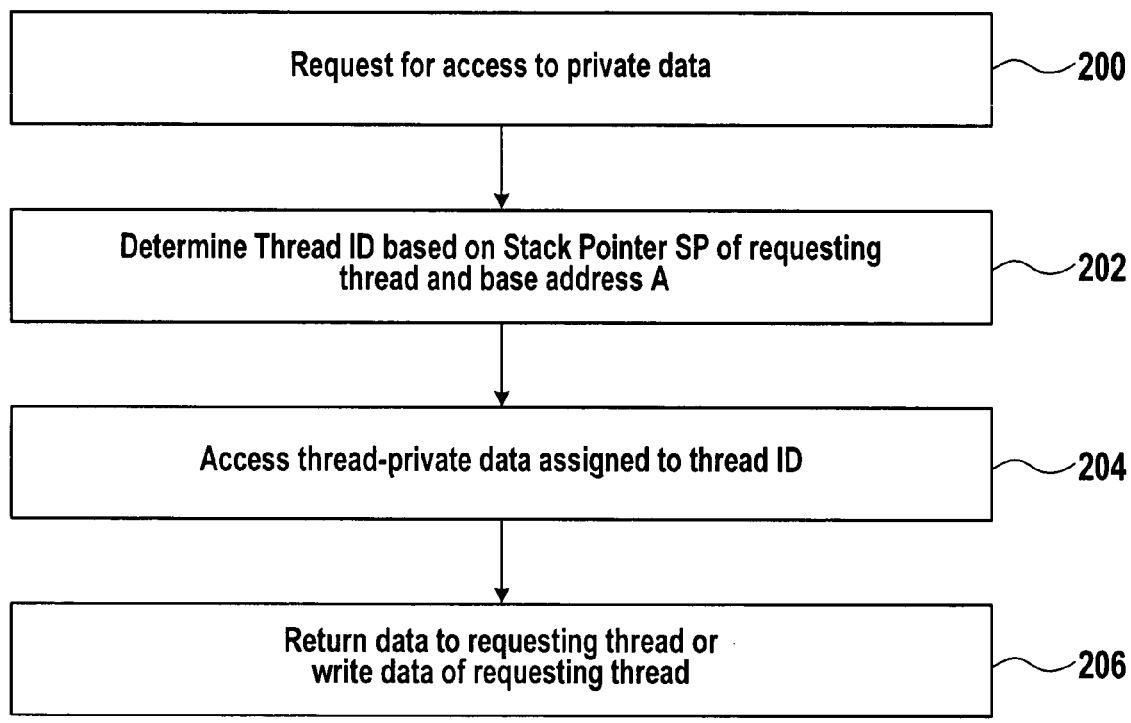
FIG. 2 is illustrative of an exemplary method for accessing thread private data on the basis of equal stack sizes, consistent with an embodiment of the invention.

FIG. 2 shows a flow chart for an exemplary method for accessing thread private data on the basis of equal stack sizes, consistent with an embodiment of the invention. In step 200, one of the threads of a program may require access to its thread private data either for a read or a write operation. In response, module 108 may determine the thread ID of the requesting thread, in step 202, on the basis of the stack pointer SP of the requesting thread and the base address A of the coherent address space covered by the different stacks of the multiple threads of the program.

In one embodiment, this may be done by calculating the integer value of the difference between stack pointer SP and base address divided by stack size S.

In step 204, the thread-private data being associated with the thread having the thread ID, as determined in step 202, may be accessed in the respective stack either to return to thread private data to the requesting thread, or to write thread private data in step 206.

Figure 3:
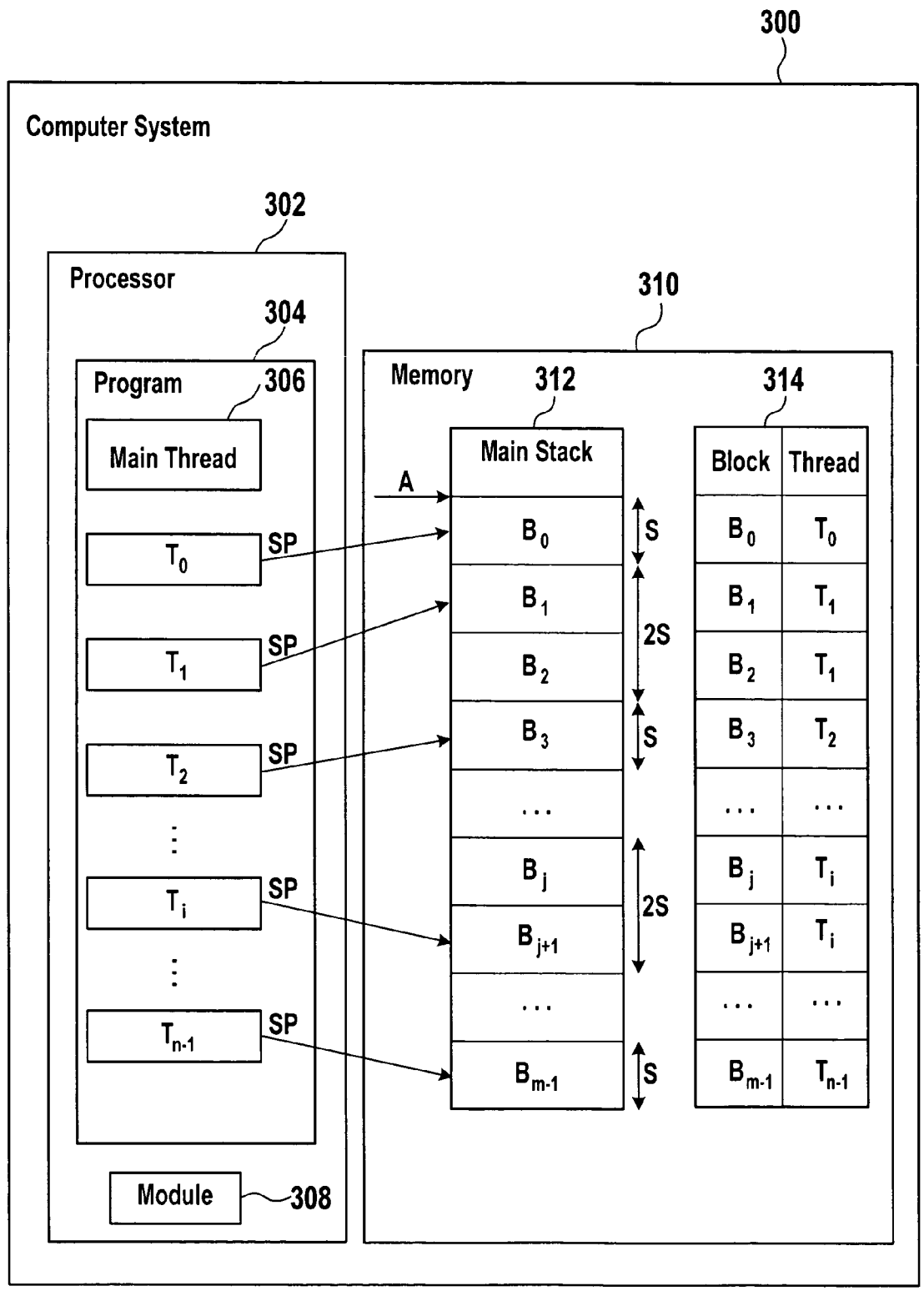
FIG. 3 is a block diagram of another exemplary computer system, consistent with an embodiment of the invention.

FIG. 3 shows a block diagram of another exemplary computer system. Elements of FIG. 3, which correspond to elements of FIG. 1, are designated by like reference numerals having added 200.

In the embodiment of FIG. 3, the different stacks of the multiple threads Ti may not have the same size, but they may be integer multiples of a certain predefined block size S. By way of example, each block Bj may have the same size S. A stack of one of the multiple threads Ti may have either the size S or an integer multiple of size S. As in the embodiment of FIG. 1, the different stacks for the multiple threads may cover a coherent address space in a memory 310.

In the example considered here, stack ST0 of thread T0 is identical to block B0 starting at base address A. In contrast, stack ST1 of thread T1 is constituted by blocks B1 and B2, and thus has a stack size of 2*S.

Further, in the example shown in FIG. 3, stack ST2 is constituted by block B3, stack STi is constituted by blocks Bj and Bj+1, and stack STn−1 is constituted by block Bm. Thus, a number of m stacks ST0 to STn−1 is constituted by a number of m blocks B0 through Bm−1, where m is equal to or greater than n.

Further, a mapping table 314 may be stored in memory 310. By means of mapping table 314, each one of the blocks may be mapped to one of the threads. In the example shown in FIG. 3, block B0 is mapped to thread T0, block B1 is mapped to thread T1, block B2 is mapped to thread T1, block B3 is mapped to thread T2, . . . etc.

As opposed to the embodiment of FIG. 1, module 308 in the embodiment of FIG. 3 may not provide the thread ID but may provide the block ID, i.e., the value of block index j. The value of the block index j may be used to determine the thread ID, i.e., the value of i by means of mapping table 314.

In operation, one of the multiple threads Ti may require access to its thread private data. This may invoke module 308. Module 308 may calculate the block ID to which the stack pointer SP of the requesting thread Ti points by subtracting base address A from stack pointer SP and dividing the result by size S. The integer value of the division by the size S may provide the block ID. An exemplary equation for calculating Block ID is given below:

$$\text{Block } ID = \text{integer}[(SP - A)/S]$$

The block ID, i.e., the value of the block index j, may be used to determine the thread ID, i.e., the value of the thread index i, by means of mapping table 314. This way the thread ID is provided and the requesting Ti can perform the required access operation with respect to its thread private data.

Figure 4:
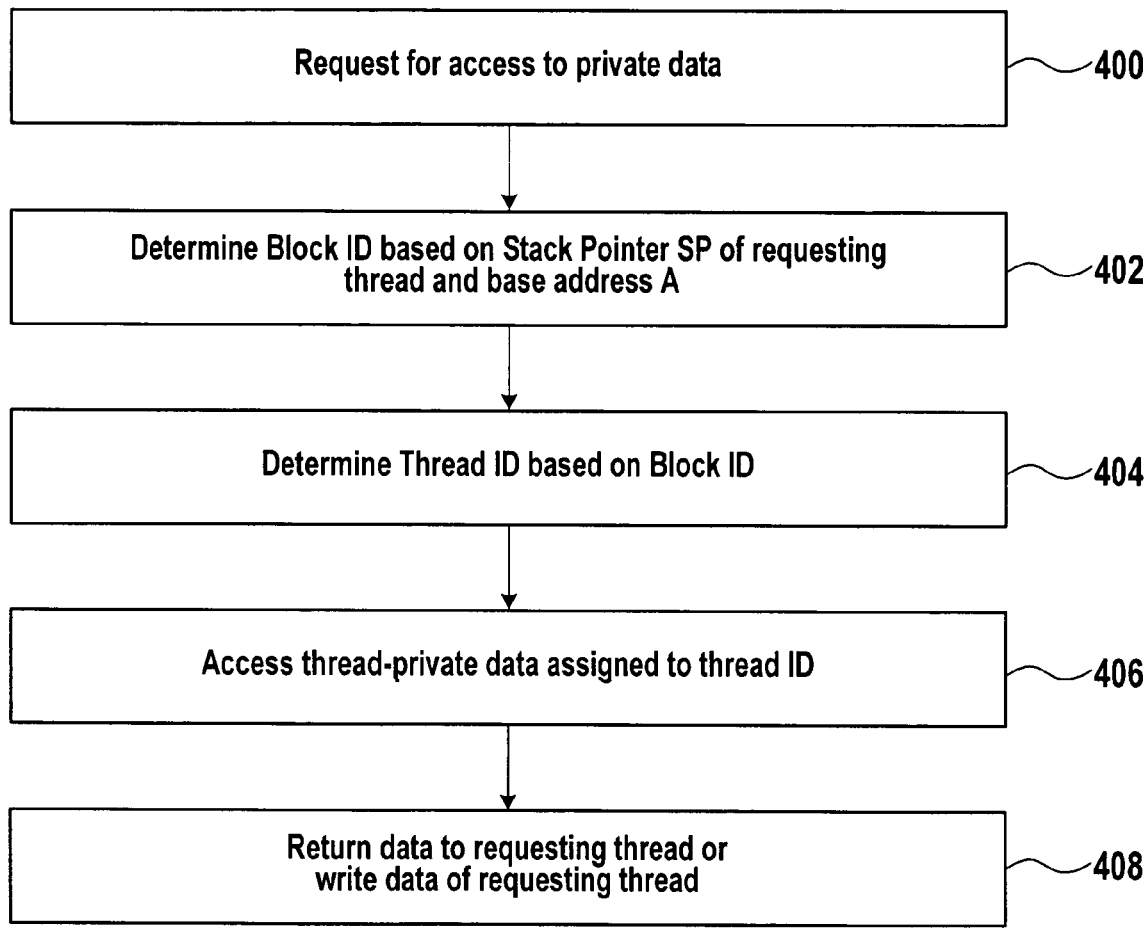
FIG. 4 is illustrative of a flow chart for an exemplary method for managing thread private data in case of various stack sizes, consistent with an embodiment of the present invention.

FIG. 4 shows a flow chart of an exemplary method for managing thread private data in case of various stack sizes, consistent with an embodiment of the invention. In step 400, one of the threads Ti may require access to its thread private data. In step 402, module 308 may determine the block ID based on the stack pointer SP of the requesting thread Ti and by means of base address A. By way of a non-limiting example, this may be done by calculating the difference between SP and A, dividing the difference by size S and determining the integer value of the result of the division. In step 404, module 308 may determine the thread ID of the requesting thread Ti based on the block ID determined in step 402. For example, this may be done by using a mapping table that maps block IDs to thread IDs.

Steps 406 and 408, shown in FIG. 4, may be performed in a similar fashion as steps 204 and 206 of FIG. 2. Thus, for example, in step 406, the thread-private data associated with the thread having the thread ID, as determined in step 404, may be accessed in the respective stack. The thread-private data may be returned to the requesting thread or written in step 408.

One skilled in the art will appreciate that the features of the present disclosure may be implemented in various data processing systems to access thread private data. Such environments and applications may be specially constructed for performing the various processes and operations of the disclosure or they may include a general-purpose computer or computing platform selectively activated or reconfigured by program code to provide the necessary functionality.

The processes disclosed herein are not inherently related to any particular computer or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Thus, while certain features and embodiments of the invention have been described, it is intended that the specification and examples be considered as exemplary only, with a true scope and spirit of the invention being indicated by the following claims and their full scope of equivalents.

What is claimed is:

1. A method of accessing thread private data in a computer for a program to be executed by using a plurality of threads, comprising:

implementing a plurality of numerical stack pointers in a processor of the computer, the stack pointers each pointing to a respective one of the plurality of threads executing in the processor;

associating each one of the plurality of threads with a different data area of a respective stack for storage of thread private data, wherein stacks of the plurality of threads cover a coherent address space in a memory of the computer starting at a numerical base address, and the plurality of stack pointers each have a respective calculable numerical relationship with the associated data areas through the use of a respective numerical thread identifier;

determining the respective thread identifier of one of the plurality of threads using a module in the processor, wherein the module calculates the thread identifier using the base address of the respective stack for storage and the respective stack pointer of the one of the plurality of threads; and accessing thread private data of one of the stacks using the determined thread identifier.

2. The method of claim 1, wherein the stacks are of equal stack size.

3. The method of claim 2, wherein the thread identifier is an integer value of the difference of the base address and the stack pointer divided by stack size.

4. The method of claim 1, wherein each of the stacks has a stack size of an integer multiple of a block size, and wherein the thread identifier is determined by:

determining a block identifier on the basis of the base address and the stack pointer, and mapping the block identifier to the thread identifier.

5. The method of claim 4, wherein the block identifier is an integer value of the difference of the base address and the stack pointer divided by the block size.

6. The method of claim 4, wherein a mapping table is used in order to obtain the thread identifier from the block identifier.

7. The method of claim 1, wherein the program has a main thread in addition to the plurality of threads, wherein the thread identifiers of the plurality of threads have a positive sign or no sign, and a thread identifier of the main thread has a negative sign.

8. The method of claim 1, wherein the thread identifier is identical to an index value of the respective stack to which the one of the plurality of threads is associated.

9. A computer system for executing a program having a plurality of threads, the computer system comprising:
   a processor for executing the program, wherein the program implements a plurality of numerical stack pointers in the processor, the stack pointers each pointing to a respective one of the plurality of threads executing in the processor;
   a memory for providing stacks for storage of thread private data for each one of the plurality of threads, wherein the stacks cover a coherent address space in the memory starting at a numerical base address, and each of the plurality of stack pointers has a respective calculable numerical relationship with the associated stacks through the use of a respective numerical thread identifier;
   a module in the processor for determining the respective thread identifier of one of the plurality of threads, wherein the module calculates the thread identifier using the base address and the respective stack pointer of the one of the plurality of threads; and
   means for accessing thread private data of one of the stacks using the determined thread identifier.

10. The computer system of claim 9, wherein the stacks are of equal size.

11. The computer system of claim 10, wherein the module for determining the thread identifier calculates an integer value of the difference of the base address and the stack pointer divided by the stack size.

12. The computer system of claim 9, wherein each one of the stacks has a size of an integer multiple of a block size.

13. The computer system of claim 9 wherein the module for determining the thread identifier calculates a block identifier using the base address and the stack pointer and accesses a mapping table in order to obtain the thread identifier on the basis of the block identifier.

14. The computer system of claim 13, wherein determining the block identifier includes determining an integer value by dividing the difference of the base address and the stack pointer by a block size.

15. The computer system of claim 14, wherein the mapping table includes an entry that associates the block identifier with the thread identifier.

16. The computer system of claim 9, wherein a main thread has a thread identifier with a negative integer value.

17. The computer system of claim 9, wherein the thread identifier is identical to an index value of the respective stack to which the one of the plurality of threads is associated.

18. A computer readable storage media storing a computer program product comprising instructions for causing a processor to perform a method for determining a thread identifier of one of a plurality of threads of a program having multiple threads, the instructions comprising:
   implementing a plurality of numerical stack pointers in a processor of the computer, the stack pointers each pointing to a respective one of the plurality of threads;
   associating each one of the plurality of threads with a dedicated data area of a respective stack for storage of thread private data of said each one of the plurality of threads, wherein the stacks cover a coherent address space in a memory starting at a numerical base address, and each of the plurality of stack pointers has a respective calculable numerical relationship with the associated data area through the use of a respective numerical thread identifier;
   determining the respective thread identifier of one of the plurality of threads using a module in the processor, wherein the module calculates the thread identifier using the base address and the respective stack pointer of the one of the plurality of threads; and
   accessing thread private data of one of the stacks using the determined thread identifier.

19. The computer readable storage media of claim 18, wherein the thread identifier is an integer value of the difference of the base address and the stack pointer divided by a given stack size.

20. The computer readable storage media of claim 18, wherein each one of the stacks has a size of an integer multiple of a block size, and wherein the method further comprises determining a block identifier using the base address and the stack pointer and mapping the block identifier to the thread identifier.

21. The computer readable storage media of claim 20, wherein the method further comprises mapping the block identifier to the thread identifier on the basis of a mapping table.

22. The computer readable storage media of claim 18, wherein the method further comprises accessing thread private data of one of the stacks based on the determined thread identifier.

23. The computer readable storage media of claim 18, wherein the thread identifier is identical to an index value of the respective stack to which the one of the plurality of threads is associated.

24. A method for managing access to thread private data in a computer, the method comprising:
   providing a main stack covering a coherent address space in a memory of the computer, the main stack further comprising a numerical base address and a plurality of stack areas;
   providing a program to at least one processor of the computer, the program implementing a plurality of numerical stack pointers pointing to respective ones of a plurality of threads;
   assigning each thread of the plurality of threads to a respective stack area of the plurality of stack areas in a numerically calculable relationship corresponding to a thread identifier;
   storing thread private data for a respective one of the plurality of threads in the stack area assigned to the respective one of the plurality of threads;
   receiving, from the processor, a request to access thread private data for one of the plurality of threads;
   calculating a thread identifier of the one of the plurality of threads using a module in the processor, the stack pointer for the one of the plurality of threads, and the base address of the main stack; and
   accessing the thread private data using the thread identifier.

25. The method of claim 24, wherein the stack areas are of equal stack size.

26. The method of claim 25, wherein calculating the thread identifier comprises calculating an integer value of the difference of the base address and the stack pointer divided by stack size.

27. The method of claim 24, wherein:
   the stack areas each have a respective stack index;
   each thread of the plurality of threads has a thread index;
   the assigning further comprises correlating each thread index of each of the plurality of threads to a respective stack index of each of the respective stack areas; and
   the calculated thread identifier correlates the thread index of the one of the plurality of threads to the stack index of the respective stack area.

* * * * *